(12) United States Patent
Canton et al.

(10) Patent No.: US 11,729,475 B2
(45) Date of Patent: Aug. 15, 2023

(54) SYSTEM AND METHOD FOR PROVIDING DESCRIPTIVE VIDEO

(71) Applicant: BCE INC., Verdun (CA)

(72) Inventors: Stuart E. Canton, Toronto (CA); Mayte Reyes Salvador, Markham (CA); Ryan McGauley, Toronto (CA); Anthony Montano, Toronto (CA)

(73) Assignee: BCE Inc., Verdun (CA)

( * ) Notice: Subject to any disclaimer, the term of this patent is extended or adjusted under 35 U.S.C. 154(b) by 29 days.

(21) Appl. No.: 16/699,391

(22) Filed: Nov. 29, 2019

(65) Prior Publication Data
US 2020/0204878 A1 Jun. 25, 2020

Related U.S. Application Data

(60) Provisional application No. 62/783,677, filed on Dec. 21, 2018.

(51) Int. Cl.
*H04N 21/84* (2011.01)
*G11B 27/036* (2006.01)
*G11B 27/10* (2006.01)
*G10L 13/00* (2006.01)

(52) U.S. Cl.
CPC ........... *H04N 21/84* (2013.01); *G11B 27/036* (2013.01); *G11B 27/10* (2013.01); *G10L 13/00* (2013.01)

(58) Field of Classification Search
None
See application file for complete search history.

(56) References Cited

U.S. PATENT DOCUMENTS

2013/0124984 A1* 5/2013 Kuspa ................ H04N 21/435 715/255
2018/0358052 A1* 12/2018 Miller ................ G11B 27/036
2019/0069045 A1* 2/2019 Kahn ................ H04N 21/2368

OTHER PUBLICATIONS

Official Action from Canadian Patent Application No. 3,065,364 dated Jan. 21, 2022.

* cited by examiner

*Primary Examiner* — Heather R Jones

(57) ABSTRACT

A system and method for providing described video for media content generates a plurality of individual audio files, possibly using text-to-speech, for each line of a described video script. The described video script provides an indication of the timing, such as for example the start time and length, of the individual described video lines. The described video script can then be used to combine the individual audio files into a single audio file for inclusion with the media content.

16 Claims, 6 Drawing Sheets

100

| Start | End | Length | Described Video Text |
|---|---|---|---|
| 00:00:10:25 | 00:00:13:03 | 00:00:02:08 | Vintage cars travel city streets. |
| 00:00:18:14 | 00:00:28:13 | 00:00:09:29 | A flag flutters. Images of Cuba flash by quickly. |

302

304
```
<?xml version="1.0"?>
<speak version="1.1"
xmlns="http://www.w3.org/2001/10/synthesis"
xmlns:xsi="http://www.w3.org/2001/XMLSchema-instance"
xsi:schemaLocation="http://www.w3.org/TR/speech-synthesis11/synthesis.xsd"
xml:lang="en-US">
<amazon:auto-breaths>
<amazon:effect name="drc">
<prosody amazon:max-duration="2.7s">Vintage cars travel city streets. </prosody>
</amazon:effect>
</amazon:auto-breaths>
```

306
```
<?xml version="1.0"?>
<speak version="1.1"
xmlns="http://www.w3.org/2001/10/synthesis"
xmlns:xsi="http://www.w3.org/2001/XMLSchema-instance"
xsi:schemaLocation="http://www.w3.org/TR/speech-synthesis11/synthesis.xsd"
xml:lang="en-US">
<amazon:auto-breaths>
<amazon:effect name="drc">
<prosody amazon:max-duration="9.8s">A flag flutters, Images of Cuba flash by quickly. </prosody>
</amazon:effect>
</amazon:auto-breaths>
```

FIG. 3

SYSTEM AND METHOD FOR PROVIDING DESCRIPTIVE VIDEO

TECHNICAL FIELD

The current disclosure relates to preparing media content for distribution and in particular to preparing descriptive video for media content.

BACKGROUND

Described video, or descriptive video, provides an audio description of on screen visual content. The visual content of the story is told by way of using voice narration during gaps of silence in the regular audio dialog of the story. Described video, also referred to as Audio Description, is an assistive technology that allows people with visual impairments to enjoy media content. Current techniques for providing described video are labor intensive and costly. Generally, an individual must watch the entire media content and create a script of the described video. The script is then read and recorded by an individual watching the same media content, typically located in a recording studio. The recorded audio is then mixed with audio of the media content, all requiring human resources.

An additional, alternative and or improved method of providing described video is desirable.

BRIEF DESCRIPTION OF THE DRAWINGS

Features, aspects and advantages of the present disclosure will become better understood with regard to the following description and accompanying drawings in which:

FIG. 3 depicts an illustrative described video script and associated SSML audio description files;

DETAILED DESCRIPTION

Figure 1:
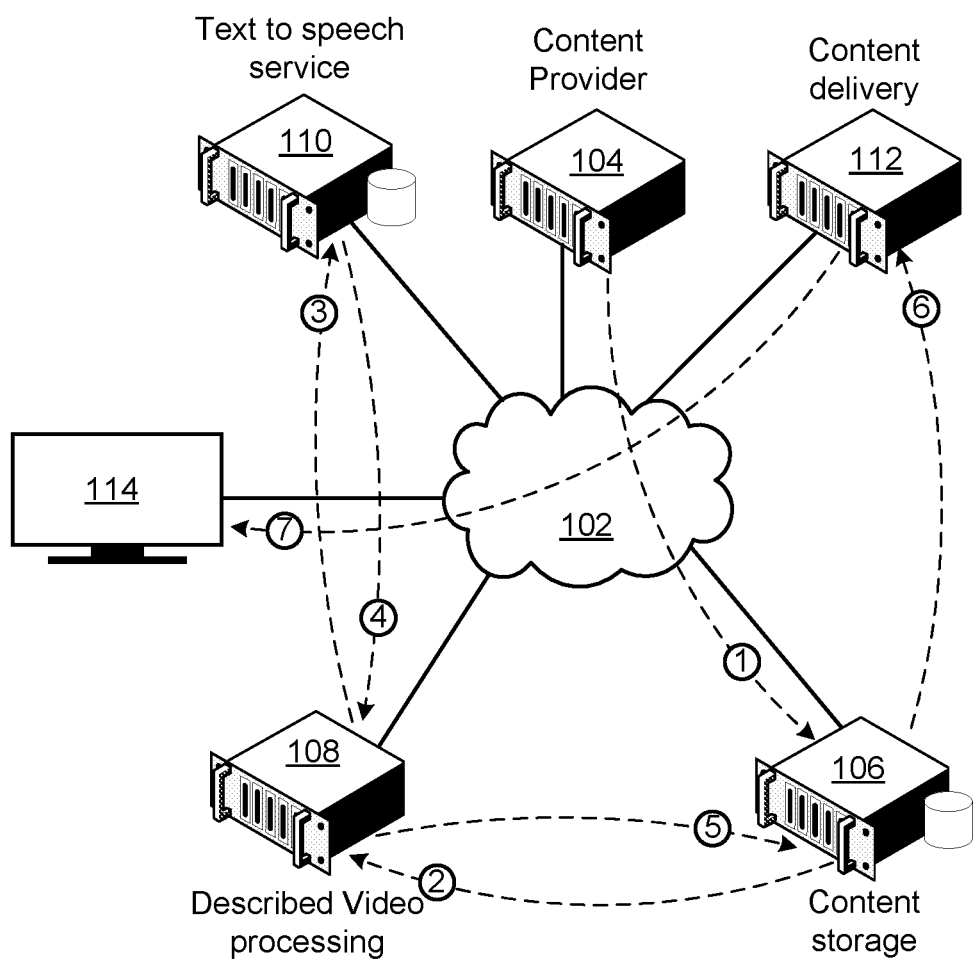
FIG. 1 depicts a system for preparing and distributing media content with described video.

In accordance with the present disclosure there is provided a method of preparing described video for media content comprising: receiving a described video script comprising a plurality of script lines each comprising timing information and an associated line of text; generating a respective audio file from the line of text of each of the plurality of script lines in the described video script; and combining the plurality of audio files into described video audio for the media content according to the timing information of the described video script.

In a further embodiment of the method, generating the respective audio file from the line of text of each of the plurality of script lines comprises: generating a speech synthesis markup language (SSML) file for each of the plurality of script lines; and generating each of the audio files using a text to speech converter according to the respective SSML file.

In a further embodiment of the method, generating a respective one of the SSML files comprises: search for a match of words in the line of text to words in a pronunciation database; and if a match is found, replacing the matched word with an associated pronunciation from the pronunciation database.

In a further embodiment of the method, generating each of the audio files using the text to speech converter according to the respective SSML file comprises: transmitting each of the SSML files to the text to speech converter; and receiving each of the audio files from the text to speech converter.

In a further embodiment, the method further comprises mixing the described video audio with audio of the media content to provide a final described video audio mix; and multiplexing the final described video audio mix into the media content.

In a further embodiment of the method, mixing the described video audio with the audio of the media and multiplexing the final described video audio mix is done using an edit decision list (EDL).

In a further embodiment of the method, the timing information comprises at least two of: a start time; a stop time; and a duration.

In a further embodiment of the method, the described video script is received in a defined format.

In a further embodiment, the method further comprises generating the described video script by: displaying a low resolution version of the media content; for each of the plurality of script lines: receiving a first input indicative of a start point in the displayed media content; determining a start time in the media content for the start point; receiving a second input indicative of a stop point in the displayed media content; determining a stop time in the media content for the stop point; generating the timing information from the start time and stop time; and receiving a text input of the line of text associated with the timing information.

In a further embodiment, the method further comprises generating a second described video script by converting each of the associated lines of text to a different language; generating a respective audio file from the line of text of each of the plurality of script lines in the second described video script; and combining the plurality of audio files into a second described video audio for the media content according to the timing information of the second described video script.

In accordance with the present disclosure there is further provided a method of generating an audio file comprising: receiving a script comprising a plurality of script lines each comprising timing information and an associated line of text; generating a plurality of audio files by generating a respective audio file from the line of text of each of the plurality of script lines in the received script; and combining the plurality of audio files into a complete audio file according to the timing information of the script.

In a further embodiment of the method, generating the respective audio file from the line of text of each of the plurality of script lines comprises: generating a speech synthesis markup language (SSML) file for each of the plurality of script lines; and generating each of the audio files using a text to speech converter according to the respective SSML file.

In a further embodiment of the method, generating each of the audio files using the text to speech converter according to the respective SSML file comprises: transmitting each of the SSML files to the text to speech converter; and receiving each of the audio files from the text to speech converter.

In a further embodiment of the method, the timing information comprises at least two of: a start time; a stop time; and a duration.

In accordance with the present disclosure there is further provided a system for preparing described video for media content, the system comprising: a processor for executing instructions; and a memory storing instructions, which when executed by the processor configure the system to perform a method as described above.

A system, and method is disclosed for performing automated text to synthetic speech synthesis for describing video for the visually impaired in a broadcast. The system and method may uses various different file formats for specifying the text to be converted to synthetic speech. The system and method may create a described video script for a video. The described video script specifies the text to be converted to synthetic speech for a number of different lines of described video, as well as timing information for each of the described video lines that specify when the described video line should occur for example to ensure the described video occurs during gaps between dialog. Each line of described video in the described video script can be converted to an audio file using a text to synthetic speech synthesis. Each of the individual audio files may then be combined together, and mixed with the original audio of the media content, according to the timing information. The resulting audio file can then be included as a described video audio channel for the media content.

The system and method for providing described video for media content generate a plurality of individual audio files, which may be done using text-to-speech synthesis, for each line of a described video script. The described video script provides an indication of the timing, such as for example the start time and proscribed length, of the individual described video lines, and so the associated audio files, within the media content. The timing information of the described video script can then be used when combining the individual speech audio files into a single audio file for inclusion with the media content. The timing information of the described video script allows the individual audio files to be combined together into a single continuous audio file that is properly synchronized with the main audio of the media content.

A conversion component may convert a text file of the descriptive video script into speech synthesis markup language (SSML) for conversion to synthesized speech. The Text to SSML authoring for descriptive video converts the text from a described video script to SSML files. Each line of text in the script may be converted to an individual SSML file. The text to SSML conversion process may also apply different SSML tags that will set the rate to have the descriptive video lines read, or synthesized, in the appropriate time. The SSML files may also specify characteristics of the synthesized speech such as emphasis, phoneme, pitch, volume, and define the type of synthetic voice to be used. The conversion component may also alter timing of the synthesized speech to fit the described video lines into the allocated time. The conversion component can specify how to apply intonation to the voices. The individual SSML files may be used to generate individual speech audio files.

The individually generated audio files of the synthesized speech for each description can be provided to a transcoder farm to align, sync and mix the individual described video (DV) audio files with the audio from the program to generate a described video audio track for the program. The process described herein eliminates or reduces the manual workflow and reduces the number of individuals that would have been required to produce the described video manually, and may also reduce the time required to add described video to a show. The process has an individual create the script for the described video, which is provided as input to the automated system. From the described video script, the voice creation, timing, audio mix and assembling can all be done by the system automatically. Time savings of more than 50% can be achieved in comparison to current techniques of using an individual to perform the scripting, reading the script, synching and mixing the audio and assembling the final program. The system and method described herein may reduce the cost of adding descriptive video to a video library.

FIG. 1 depicts a system for preparing and distributing media content with described video. The system 100 comprises a number of interacting components, including for example computers, servers, network delivery components, and content consumption components. A single network 102 is depicted as connecting all of the components together, however, it will be appreciated that the depicted network 102 may be provided as one or more interconnected private and public networks. One or more content providers, depicted as content provider server 104, can provide media content, for example a show, movie, sporting event, etc. that is distributed to content consumers. The media content may be provided to a content storage location 106, depicted by arrow (1). The media content comprises audio and video. In order to enable those with visual impairments to also enjoy the media content, the visual content of the media may be described in an audio channel. That is, audio descriptions of the visual content of the media may be added to the audio content of the media content.

In order to generate the described video audio content, a described video processing server 108 may select and retrieve the media content to have the described video added to from the content storage 106, depicted by arrow (2). The described video processing server 108 may have functionality for displaying the media content to an individual that generates the described video script. The functionality may be provided by, for example, closed captioning software typically used to add closed captions or subtitles to media content. The closed captioning software allows for the playback of the media content as well as entering text descriptions and associating particular timing information with the text descriptions. The described video script can be generated from the closed captioning software and comprises a plurality of descriptive video lines each associated with specific timing information. The timing information allows the individual generating the described video script to specify, for example, a start time at which the described video line should begin and when the line should be completed. The described video processing server 108 may generate individual Speech Synthesis Markup Language (SSML) files for each line of described video text from the described video script. Each SSML file can be sent to a text-to-speech synthesis service server 110, depicted by arrow (3). The individual generated speech audio files, comprising the synthesized speech corresponding to respective lines of the described video text, can be returned to the described video processing server 108, depicted by arrow (4). These individual audio files received by the processing server can then be used to generate a described video audio stream and added to the media content. The described video audio stream can be generated from the individual audio files returned from the text to speech service by combining and synching the individual audio files together using the timing information of the described video script and mixing with main audio of the media content. In order to synchronize the described video audio files with the video content, as well as possibly other audio such as dialogue, the timing information from the described video script is used. The audio for the described video may be mixed with audio from the media content to provide a more consistent audio experience. Once the audio of the described video is added to the media content it can be provided to the content storage server 106 for storage, depicted as arrow (5). Once the media content is stored it can be retrieved by a content delivery server 112, depicted by arrow (6) and delivered to a user, depicted by arrow (7). The media content, including the described video, can be played back on a content consumption device such as a television 114.

The process begins with media content being selected and delivered to a server, or servers, providing automated workflow functionality. A low resolution version of the media may be generated and delivered to the descriptor creator, who identifies points in which audio of video descriptors should and can be added in accordance with described video best practices. The descriptor creator may use a closed captioning product, such as Caption Maker, as it provides a convenient user interface to view the low resolution video and the ability to generate and insert text at specific time code points within the media content or video. The timecode references are carried through to the end of the process and allows the individual audio descriptor lines to be correctly synthesized, or spoken, as well as properly synching the generated individual audio files to the associated media content or video. An output text file, or the described video script, from the descriptor creator that has 'n' described video lines will be broken into 'n' files, which may be individual SSML files. Breaking the script into individual lines is useful in described video where there may be long periods of time in which the on screen actors are speaking, and therefore no described video should be applied. Breaking the described video lines of the script into individual files may be useful in synching the audio files with the video. While a single audio file could be provided, any small errors in the time synchronization will be accumulated over the entire length of the media content and may result in descriptive video audio being overlapped with dialogue audio of the media content. Further, by separating the described video script lines into separate files, the voice synthesis can be provided in less time since multiple files may be generated in parallel. For example, performing voice tracking in a linear timeline with a 22 minute program at the very least would take 22 minutes. If there were as few as 30 described video lines in a 22 minute program that each have a 5 seconds duration that would only amount to 150 seconds of recorded media. Furthermore if the descriptive video audio is recorded by an individual in a booth instead of using text-to-speech synthesis, this could result in as little as 5 minutes of voice time in the booth, a time saving of over four times.

Figure 2:
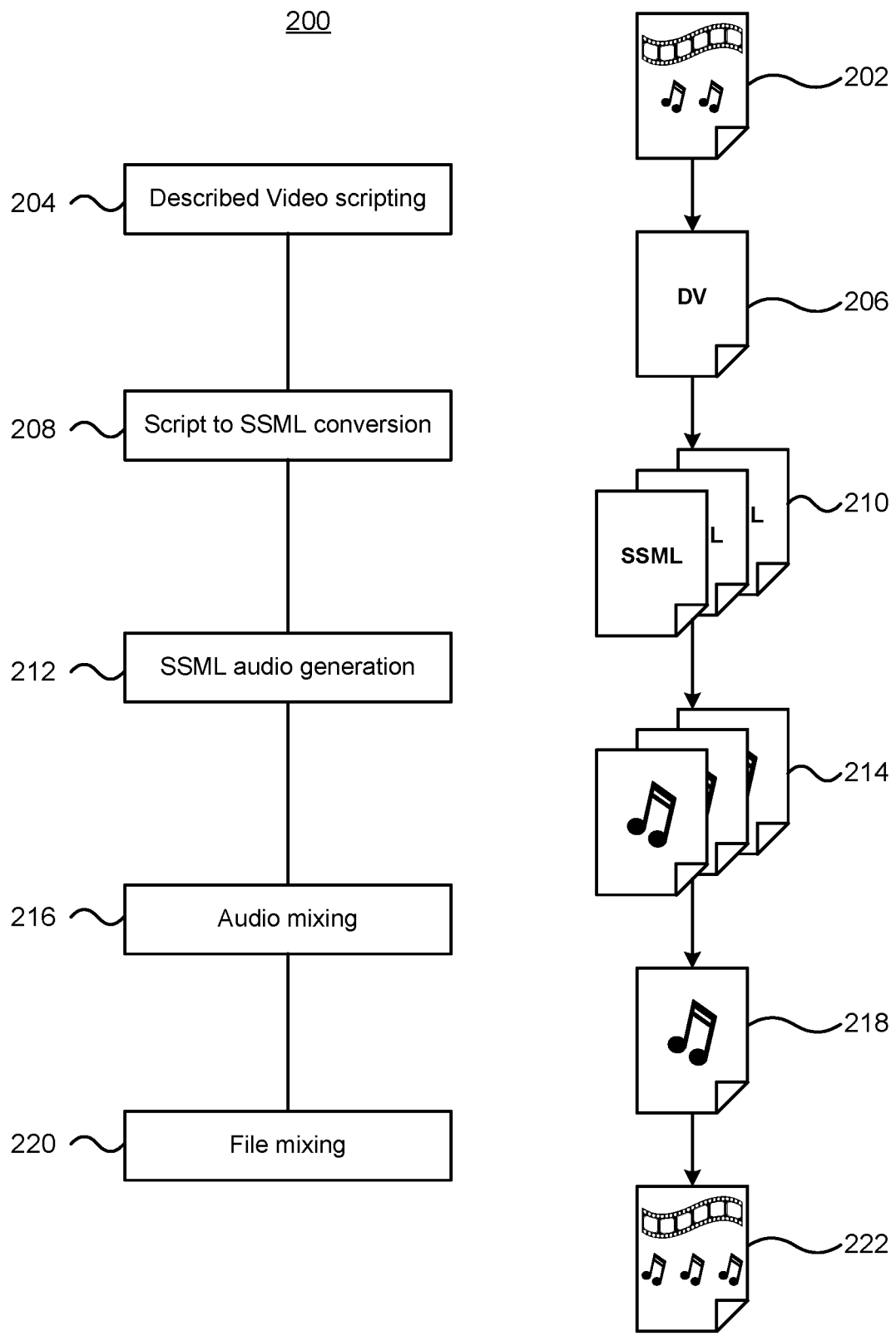
FIG. 2 depicts a method of preparing media content with described video.

FIG. 2 depicts a method 200 of preparing media content with described video. As depicted, a media content file 202 is selected for which described video is to be added. Media content can be selected automatically from a catalogue of existing media content and assigned to an individual for generating the described video script. The method 200 includes manually generating the described video script (204) by a descriptor creator. It will be appreciated that a low resolution version of the media content can be used when generating the described video script to reduce the resources required for transferring the media content as well as playing back the media content. As an example, the media content may be played back using a system for generating closed captioning or subtitles. The closed captioning system is usually used for entering the text of spoken dialogue in the media content and allows the individual creating the closed captions to specify timecodes for the closed captioning text so that it can be synchronized on screen with the spoken dialogue. The same closed captioning system can be used to generate the described video script and associating each described video line of text with timecodes so that the audio corresponding to the described video lines of text will be synched appropriately with intervals of silence in the media content, and will not overlap with spoken dialog or other audio in the media content. The described video scripting step (204) provides a described video script 206 that includes a plurality of lines of text each associated with respective timing information, which may be for example a start time and the length of time the generated synthesized speech of the line of text should be completed in. The length of the synthesized audio may be specified as a start/stop time and/or a duration. The distributed video script 206 may be generated in a particular format specific to the closed captioning functionality, or in other formats including for example in a text file. The described video script 206 is converted to individual SSML files (208). The described video script 206 has a plurality of text lines each associated with its own timing information. The script to SSML conversion (208) generates individual SSML files 210 for each line of described video text in the described video script. Generating individual SSML files for each line in the described video script allows the audio characteristics of each described video line to be tailored to the particular line. For example, different lines may be sped up or slowed down in order to fit within the allotted amount of time for the particular line. When converting the described video script to individual SSML files, the script may be processed to sanitize the text of any characters that are not friendly for SSML. Each line of described video text can be converted into its own SSML file and different types of SSML tags that may make the voice sound more human may be applied. The application of tags may be based on a simple substitution, for example substituting a word with a better SSML representation or using other techniques. The individual SSML files 210 can be provided to a speech synthesis engine and used to generate individual audio files 214 from the SSML files (212). The generated audio files 214 can be combined together according to the timing information of the respective described video lines in described video script. The audio mixing step (216) generates a single audio file 218 that includes the audio of all of the individual described video audio files 214. The audio mixing may mix the audio from other channels of the media content so that the described video is overlaid on the audio of the media content. Specifically, an Edit Decision List (EDL) may be used that will trigger the transcoder farm to create a unique audio file with all the described video descriptors synchronized to the allotted time slots of the video as provided by the timing information of the described video script to provide a frame accurate synchronized audio file with all of the described video audio. The EDL provides a list of timecode data and associated described video files names or locations that can be used to generate a single described video audio file. Described video audio alignment, composition and creation may be completed by the transcoder farm. File mixing step (220) may then use standard techniques to combine the audio file 218 with the media content to provide media content that has the described video audio 222. The main audio, including for example the dialog, from the media content can be extracted and the a script may create an UPMIX audio profile for mixing the described video audio file with the extracted main audio of the media content. The mixing may apply audio-ducking as well as loudness adjusting to create a final audio file that includes both the described video audio and the main audio, which may then be embedded to channels 7 and 8 of the media content.

The described video script and/or the individual generated SSML files may be archived or stored in order to be used with other versions of the media content. For example, a different language version of the media content may use the same descriptive video script, but with the text lines translated to the desired language to generate the descriptive video audio files for the different language of the media content.

FIG. 3 depicts an illustrative described video script and its associated SSML audio description files. As depicted, a described video script 302 may include a plurality of different text lines of the described video and associated timing information. The timing information is depicted as respective timecodes for the start time and end time of the period during which the described video can be spoken as well as the length of the period. The described video script 302 only depicts two lines of described video, however media content may generally have more lines. Each line of described video in the script 302 is converted to a respective SSML file 304, 306. It will be appreciated that the described video SSML files each specify characteristics for how to synthesize the text line.

Figure 4:
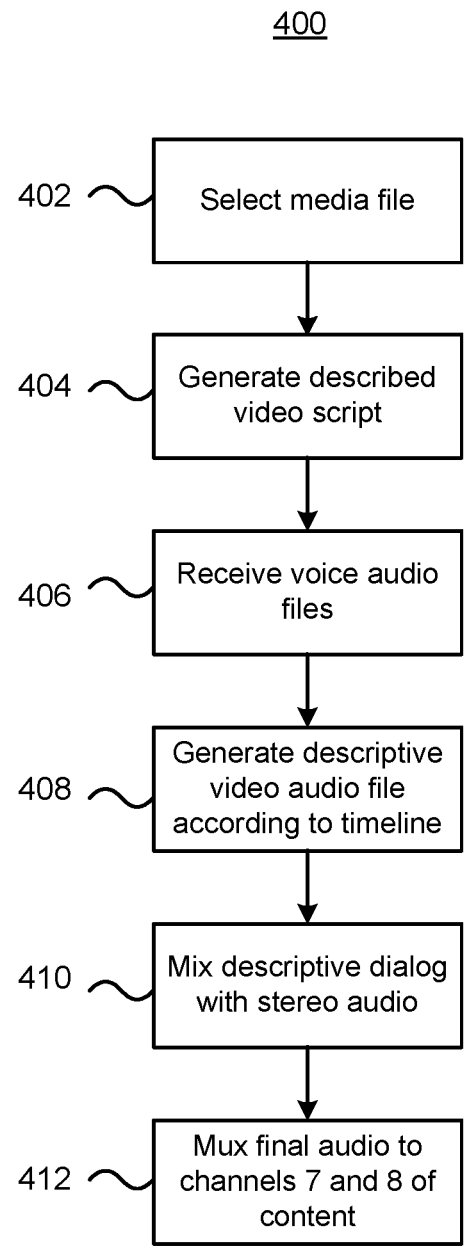
FIG. 4 depicts a further method of preparing media content with described video.

FIG. 4 depicts a further method of preparing media content with described video. The method 400 selects a media content file (402) that is to have described video added. A described video script is generated (404) that includes a plurality of lines of text of described video, each with associated timing information. The described video script is used to generate individual described video audio files corresponding to the individual lines of the script. The individual described video audio files of each of the individual lines are received (406). The individual audio files may be combined together into a single audio file according to the timing information of the described video script (408). The audio file may be mixed with other audio of the media content, such as the left and right stereo audio content of the media to overlay the described video audio over the existing audio (410) of the media content. The mixed described audio file can then be combined together with the other media content for example onto channels 7 and 8 of the media content file (412).

Figure 5:
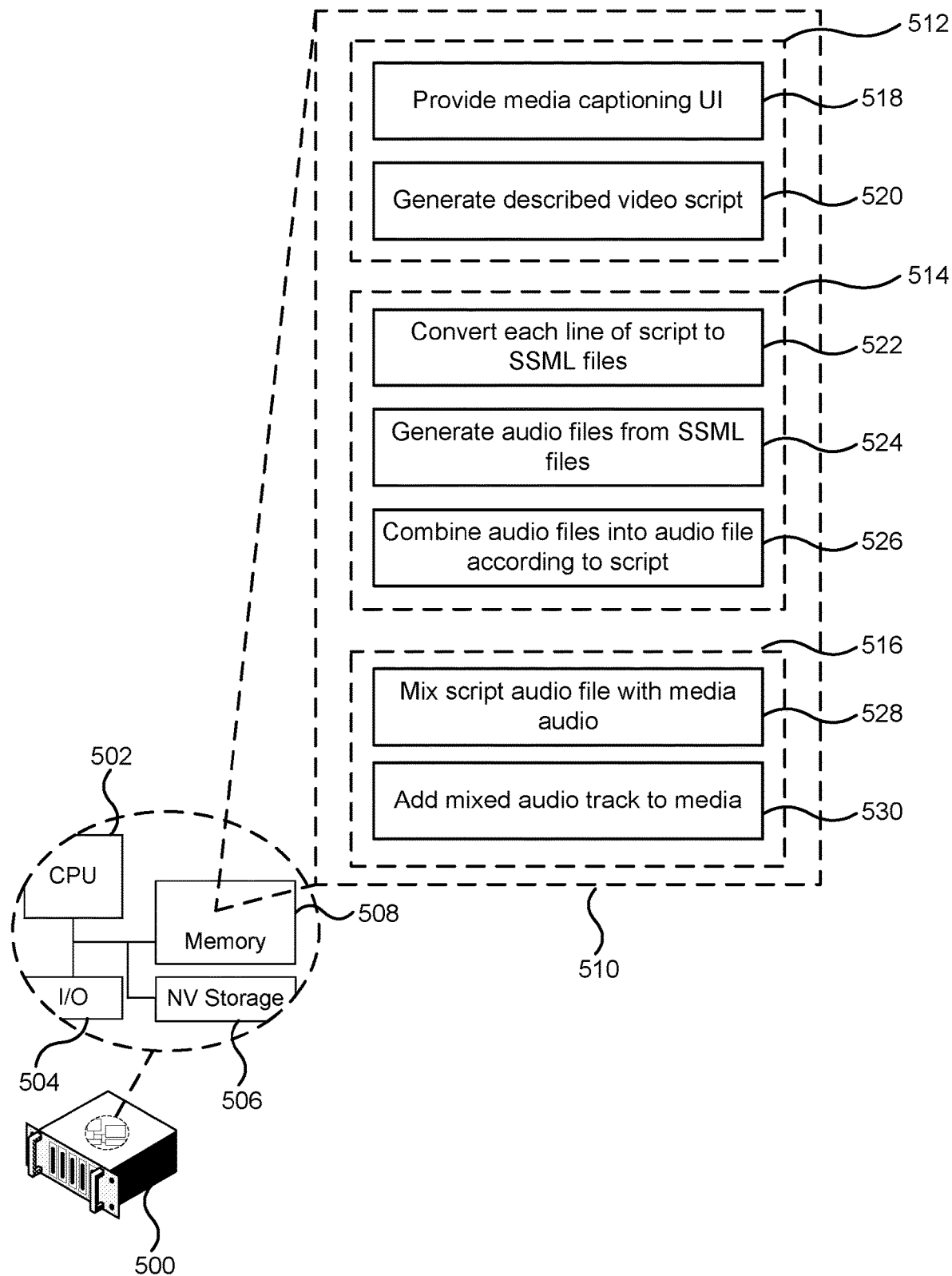
FIG. 5 depicts a system for preparing media content with described video.

FIG. 5 depicts a system for preparing media content with described video. The system 500 comprises a processor (CPU) 502 for executing instructions. An input/output (I/O) interface 504 for connecting other components such as monitors, keyboard/mice, speakers, microphones, network interfaces, etc., to the system 500. The system may also comprise non-volatile storage 506, such as a hard drive, solid state drive, etc., as well volatile memory 508. The memory 508 stores data and instructions, which when executed by the processor 502 configure the system 500 to provide various functionality 510. The functionality 510 may include script-generation functionality 512, audio generation functionality 514 that generates an audio file according to a script, and audio mixing functionality 516 for combining a script audio file with a media file.

The script-generation functionality 512 may be provided by existing software used for closed captioning of media content. Alternatively, the script-generation functionality 512 may be provided as separate functionality for generating scripts for described video. The script-generation functionality 512 provides a media captioning user interface (UI) (518). The UI may display the media content as well as provide means for an individual to enter lines of text and associate timing information, such as start and end times of when the script line can be inserted into the audio. The captioning UI is used to generate a described video script (520). The script-generation functionality 512 may include functionality for associating the generated script with the media content. For example, the script may be stored in association with the media content, for example in a common folder, or may share a common file name identifier, or the script may be incorporated into the file structure of the media content.

The audio generation functionality 514 receives a script and generates a corresponding audio file. The script may be received from, for example, the script-generation functionality 512 described above, or the script may be provided in other ways, including, for example through the use of artificial intelligence (AI). Regardless of how the script is generated, the audio generation functionality 514 receives the script and converts each line of the script to corresponding SSML files (522). When generating the SSML, the functionality 514 may estimate a length of time the line of text will take to playback and using the timing information in the script, determine if the timing when synthesizing the speech should be sped up. Additionally, the functionality 514 may also substitute words or phrases in the script that are known to be difficult in synthesizing with corresponding phonetic spellings. The functionality may use dictionary of words and associated phonetic spellings to search the text and match words in the text that should be replaced with their phonetic spellings. Once the SSML files are created they are used to generate individual audio files from the SSML files (524). The functionality may synthesize the audio files from the SSML files, or the functionality may submit the SSML files to a service for synthesizing the audio files. Regardless of how the audio files are generated, they are combined into a single audio file according to the timing information in the script (526). Once the single script audio file is generated it may be used as an audio track or further processed. For example, the audio mixing functionality 516 may further process the script audio file in order to mix the script audio file with the media audio track (528). The audio may be mixed, for example by raising and or lowering the volume of one or more of the audio tracks in order to provide a more seamless track. That is the audio of the media may be lowered so that the script audio can be heard when speech is present. Once the audio track is mixed, it is multiplexed with the media content (530). For example, the audio track may be added as the $8^{th}$ and $9^{th}$ audio tracks of the media content. The media may then be stored for subsequent use.

The script may also be stored in association with the media content and/or the audio files. Audio files may be re-used for common portions of media. For example, a show may always begin in the same manner, and the audio files associated with the common time may be reused rather than synthesizing the audio each time. Further, the scripts may be processed to generate additional scripts. For example, the script may be translated into a different language and used for generating a described video track in an alternate language.

Figure 6:
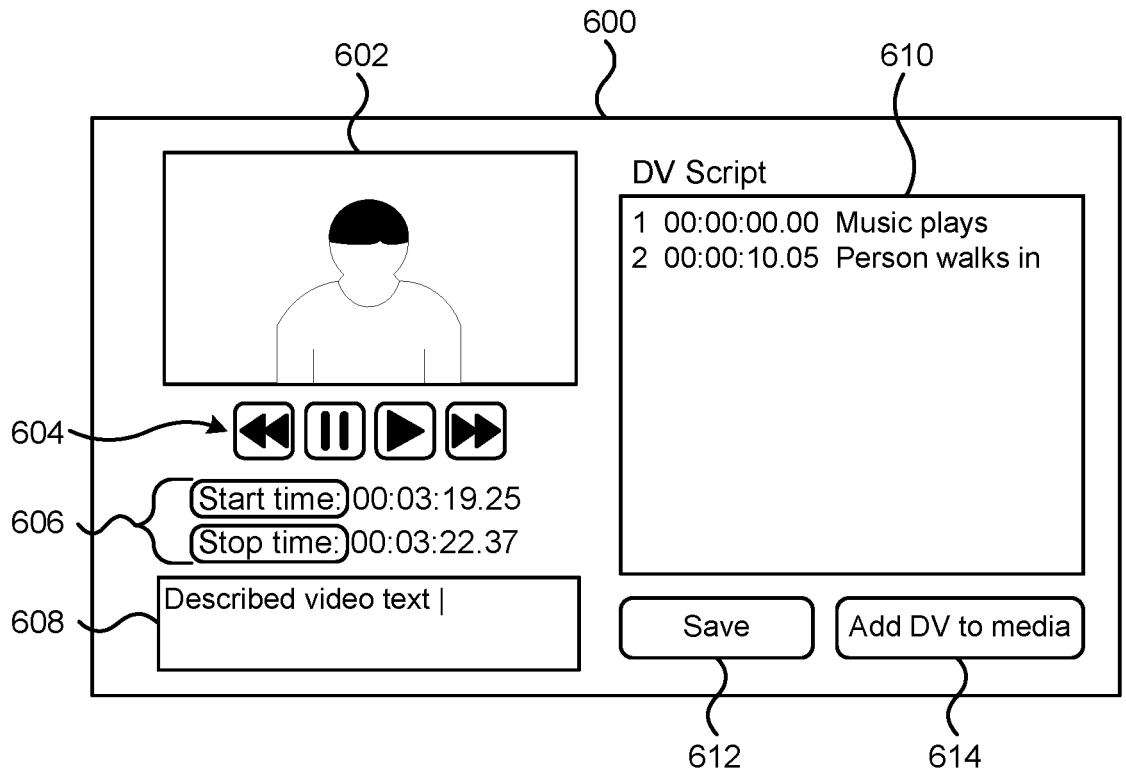
FIG. 6 depicts a user interface for preparing a described video script.

FIG. 6 depicts a user interface for preparing a described video script. The user interface 600 may be generated and displayed to user responsible for generating the described video script. The media content is displayed 602, typically in a low quality version along with controls 604 for controlling play back of the video. The UI may also include controls 606 for marking the timing information, such as the start time, stop time and/or duration of when the script line may be inserted. The UI further includes an input 608 for inputting a line of text of the script. The UI may further include a display of the script 610 as it is being generated. The UI may also include a control 612 for saving the DV file as well as a control for adding the described video audio to the media 614, which may provide the script and media information to functionality for generating the DV audio such as that described above.

Although the above has described generating audio for use in described video applications, the same functionality and techniques may be used for other applications. The media content may be recorded content or it may be live content. For live content, a delay may be required in order to provide sufficient time to generate a script, or at least a line of the script along with timing information as to when the script line may be inserted. Further, it is possible to use the same technique for generating audio for insertion into radio broadcasts. For example, the script may be generated to provide weather details at particular time intervals. Other applications will be apparent to one of ordinary skill in the art.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the components and processes described herein may be provided by various combinations of software, firmware and/or hardware, other than the specific implementations described herein as illustrative examples.

Numerous additional variations on the methods and apparatus of the various embodiments described above will be apparent to those skilled in the art in view of the above description. Such variations are to be considered within the scope.

What is claimed is:

1. A method of preparing described video for media content comprising:
   receiving a described video script comprising:
      a plurality of script lines, each script line comprising:
      an associated line of text; and
      timing information defining timing of an audio gap within the media content for insertion of audio corresponding to the associated line of text within the media content;
   generating a plurality of speech synthesis markup language (SSML) files, each SSML file corresponding to a respective script line of the plurality of script lines and having a maximum length based on the timing information of the respective script line;
   generating a plurality of audio files, each audio file generated from a respective SSML file, wherein at least one of the plurality of audio files comprises audio generated from the line of text that has been sped up in order to fit within the timing of the respective audio gap; and
   combining the plurality of audio files into described video audio for the media content according to the timing information of the described video script.

2. The method of claim 1, wherein generating the plurality of audio files comprises:
   generating each of the audio files using a text to speech converter according to the respective SSML file.

3. The method of claim 2, wherein generating a respective one of the SSML files comprises:
   search for a match of words in the line of text to words in a pronunciation database; and
   if a match is found, replacing the matched word with an associated pronunciation from the pronunciation database.

4. The method of claim 2, wherein generating each of the audio files using the text to speech converter according to the respective SSML file comprises:
   transmitting each of the SSML files to the text to speech converter; and
   receiving each of the audio files from the text to speech converter.

5. The method of claim 1, further comprising:
   mixing the described video audio with audio of the media content to provide a final described video audio mix; and
   multiplexing the final described video audio mix into the media content.

6. The method of claim 5, wherein mixing the described video audio with the audio of the media and multiplexing the final described video audio mix is done using an edit decision list (EDL).

7. The method of claim 1, wherein the timing information comprises at least two of:
   a start time;
   a stop time; and
   a duration.

8. The method of claim 1, wherein the described video script is received in a defined format.

9. The method of claim 1, further comprising generating the described video script by:
   displaying a low resolution version of the media content;
   for each of the plurality of script lines:
      receiving a first input indicative of a start point in the displayed media content;
      determining a start time in the media content for the start point;
      receiving a second input indicative of a stop point in the displayed media content;
      determining a stop time in the media content for the stop point;
      generating the timing information from the start time and stop time; and
      receiving a text input of the line of text associated with the timing information.

10. The method of claim 1, further comprising:
   generating a second described video script by converting each of the associated lines of text to a different language;
   generating a respective audio file from the line of text of each of the plurality of script lines in the second described video script; and
   combining the plurality of audio files into a second described video audio for the media content according to the timing information of the second described video script.

11. A method of generating an audio file comprising:
   receiving a script comprising a plurality of script lines, each script line comprising:
      an associated line of text; and timing information defining possible timing of the associated line of text within a complete audio file;

generating a plurality of speech synthesis markup language (SSML) files, each SSML file corresponding to a respective script line of the plurality of script lines and having a maximum length based on the timing information of the respective script line;

generating a plurality of audio files, each audio file generated from a respective SSML file, wherein at least one of the plurality of audio files comprises audio generated from the line of text that has been sped up in order to fit within the timing of the respective audio gap; and combining the plurality of audio files into the complete audio file according to the timing information of the script.

12. The method of claim 11, wherein generating the plurality of audio files comprises:

generating each of the audio files using a text to speech converter according to the respective SSML file.

13. The method of claim 12, wherein generating each of the audio files using the text to speech converter according to the respective SSML file comprises:

transmitting each of the SSML files to the text to speech converter; and receiving each of the audio files from the text to speech converter.

14. The method of claim 11, wherein the timing information comprises at least two of:

a start time;

a stop time; and a duration.

15. A system for preparing described video for media content, the system comprising:

a processor for executing instructions; and a memory storing instructions, which when executed by the processor configure the system to perform a method according to claim 1.

16. A system for generating an audio file, the system comprising:

a processor for executing instructions; and a memory storing instructions, which when executed by the processor configure the system to perform a method according to claim 11.

\* \* \* \* \*